(12) United States Patent
Kurita et al.

(10) Patent No.: US 12,213,088 B2
(45) Date of Patent: Jan. 28, 2025

(54) TERMINAL

(71) Applicant: NTT DOCOMO, INC., Tokyo (JP)

(72) Inventors: Daisuke Kurita, Tokyo (JP); Hiroki Harada, Tokyo (JP); Shinya Kumagai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 371 days.

(21) Appl. No.: 17/756,020

(22) PCT Filed: Nov. 14, 2019

(86) PCT No.: PCT/JP2019/044780
§ 371 (c)(1),
(2) Date: May 13, 2022

(87) PCT Pub. No.: WO2021/095215
PCT Pub. Date: May 20, 2021

(65) Prior Publication Data
US 2022/0408383 A1 Dec. 22, 2022

(51) Int. Cl.
*H04W 56/00* (2009.01)
(52) U.S. Cl.
CPC ...... *H04W 56/001* (2013.01); *H04W 56/0035* (2013.01)
(58) Field of Classification Search
CPC .................................................. H04W 56/00
See application file for complete search history.

(56) References Cited

U.S. PATENT DOCUMENTS

2019/0306832 A1* 10/2019 Si ........................ H04L 5/0082

FOREIGN PATENT DOCUMENTS

WO    WO-2021092774 A1 *  5/2021 ....... H04L 27/26025

OTHER PUBLICATIONS

Translation of WO-2021092774 (Year: 2021).*
Office Action issued in counterpart Japanese Patent Application No. 2021-555732 mailed on Mar. 26, 2024 (6 pages).
Potevio; "Enhancements to Initial Access Procedures for NR-U"; 3GPP TSG RAN WG1 #99, R1-1913056; Reno, USA; Nov. 18-22, 2019 (5 pages).
Qualcomm Incorporated; "Initial access and mobility procedures for NR unlicensed"; 3GPP TSG RAN WG1 Meeting #98bis, R1-1911098; Chongqing, China; Oct. 14-20, 2019 (15 pages).
Office Action issued in counterpart Japanese Application No. 2021-555732, mailed Nov. 14, 2023 (6 pages).
Extended European Search Report issued in counterpart European Patent Application No. 19952206.1, mailed on Aug. 10, 2023 (7 pages).

(Continued)

*Primary Examiner* — Kevin C. Harper
(74) *Attorney, Agent, or Firm* — Osha Bergman Watanabe & Burton LLP

(57) ABSTRACT

A terminal receives a master information block and a synchronization signal block from a radio base station, and acquires an offset between the synchronization signal block and a control resource set by using a parameter for quasi co-location derivation included in the master information block. The terminal assumes quasi co-location associated with the synchronization signal block based on the acquired offset.

4 Claims, 10 Drawing Sheets

(56) References Cited

OTHER PUBLICATIONS

OPPO; "Enhancements to initial access procedure for NR-U"; 3GPP TSG RAN WG1 #99, R1-1912507; Reno, USA, Nov. 18-22, 2019 (8 pages).
International Search Report issued in PCT/JP2019/044780, mailed on Jun. 30, 2020 (3 pages).
Written Opinion of the International Searching Authority PCT/JP2019/044780, mailed on Jun. 30, 2020 (3 pages).
Charter Communications; "Feature lead summary 3 of Enhancements to initial access procedure"; 3GPP TSG RAN WG1 Meeting #98BIS, R1-1911685; Chongqing, P.R. China, Oct. 14-20, 2019 (19 pages).
3GPP TR 38.889 V16.0.0; "3rd Generation Partnership Project; Technical Specification Group Radio Access Network; Study on NR-based access to unlicensed spectrum (Release 16)"; Dec. 2018 (119 pages).
Sharp; "Initial access procedure for NR-U"; 3GPP TSG RAN WG1 #99, R1-1912765; Reno, USA, Nov. 18-22, 2019 (8 pages).
Office Action issued in Japanese Application No. 2021-555732; Dated Sep. 3, 2024 (5 pages).
Office Action issued in Chinese Application No. 201980101811.1; Dated Jul. 23, 2024 (18 pages).

\* cited by examiner

FIG. 5

```
-- ASN1START
-- TAG-MIB-START

MIB ::=                           SEQUENCE {
    systemFrameNumber                 BIT STRING (SIZE (6)),
    subCarrierSpacingCommon           ENUMERATED {scs15or60, scs30or120},
    ssb-SubcarrierOffset              INTEGER (0..15),
    dmrs-TypeA-Position               ENUMERATED {pos2, pos3},
    pdcch-ConfigSIB1                  PDCCH-ConfigSIB1,
    cellBarred                        ENUMERATED {barred, notBarred},
    intraFreqReselection              ENUMERATED {allowed, notAllowed},
    spare                             BIT STRING (SIZE (1))
}

-- TAG-MIB-STOP
-- ASN1STOP
```

MIB

FIG. 6

PDCCH-ConfigSIB1 information element

```
-- ASN1START
-- TAG-PDCCH-CONFIGSIB1-START

PDCCH-ConfigSIB1 ::=         SEQUENCE {
    controlResourceSetZero       ControlResourceSetZero,
    searchSpaceZero
}

-- TAG-PDCCH-CONFIGSIB1-STOP
-- ASN1STOP
```

TERMINAL

TECHNICAL FIELD

The present invention relates to a terminal that performs radio communication, and more particularly, to a terminal that uses an unlicensed frequency band.

BACKGROUND ART

The 3rd Generation Partnership Project (3GPP) specifies Long Term Evolution (LTE) and specifies LTE-Advanced (hereinafter referred to as LTE including LTE-Advanced) and 5th generation mobile communication system (called 5G, New Radio (NR), or Next Generation (NG)) for the purpose of further increasing the speed of LTE.

For example, even in NR, as in LTE, New Radio-Unlicensed (NR-U), which extends an available frequency band by using a spectrum of an unlicensed frequency band, is being discussed (Non Patent Literature 1).

Also, regarding initial access in NR-U, a notifying method of a terminal (User Equipment, UE) of Q, which is a parameter used to derive Quasi Co-Location (QCL) of SS/PBCH Block (SSB) including a synchronization signal (SS: Synchronization Signal) and a downlink physical broadcast channel (PBCH: Physical Broadcast CHannel), is being discussed (Non Patent Literature 2).

Among them, it is agreed to notify Q by using a master information block (MIB: Master Information Block) or a system information block (SIB: System Information Block), specifically, the Remaining Minimum System Information (RMSI) of SIB1.

CITATION LIST

Non Patent Literature

Non Patent Literature 1: 3GPP TR 38.889 V16.0.0, 3rd Generation Partnership Project; Technical Specification Group Radio Access Network; Study on NR-based access to unlicensed spectrum (Release 16), 3GPP, December 2018

Non Patent Literature 2: "Feature lead summary 3 of Enhancements to initial access procedure", R1-1911685, 3GPP TSG RAN WG1 Meeting #96, 3GPP, October 2019

SUMMARY OF INVENTION

Considering the realization of good initial access in NR-U, it is desirable to use MIB to notify Q that is a parameter used for deriving QCL of SSB. This is because a terminal promptly acquires Q and decodes MIB to derive QCL in initial access, and thus, it is possible to specify an SSB position that requires monitoring from transmission candidate positions of a plurality of SSBs.

However, the size of the MIB is limited and it is not easy to secure the amount of information (the number of bits) required for Q notification in the same field.

Therefore, the present invention has been made in view of such circumstances, and an object of the present invention is to provide a terminal capable of promptly acquiring a parameter used for deriving quasi co-location (QCL) of SSB (SS/PBCH Block).

According to one aspect of the present disclosure, a terminal (UE 200) includes: a receiving unit (control signal/ reference signal processing unit 240) configured to receive a master information block and a synchronization signal block from a radio base station (gNB 100); and a control unit (control unit 270) configured to acquire an offset between the synchronization signal block and a control resource set by using a parameter for quasi co-location derivation included in the master information block, and assume quasi co-location associated with the synchronization signal block based on the acquired offset.

According to one aspect of the present disclosure, a terminal (UE 200) includes: a receiving unit (control signal/ reference signal processing unit 240) configured to receive a master information block and a synchronization signal block from a radio base station (gNB 100); and a control unit (control unit 270) configured to assume quasi co-location associated with the synchronization signal block based on a parameter for quasi co-location derivation included in the master information block and an offset between the synchronization signal block and a control resource set included in the master information block.

According to one aspect of the present disclosure, a terminal (UE 200) includes: a receiving unit (control signal/ reference signal processing unit 240) configured to receive a master information block and a synchronization signal block from a radio base station (gNB 100); and a control unit (control unit 270) configured to assume quasi co-location associated with the synchronization signal block by using a parameter for quasi co-location derivation included over a plurality of fields constituting the master information block.

BRIEF DESCRIPTION OF DRAWINGS

FIG. 5 is a diagram illustrating a configuration example of an MIB.

FIG. 6 is a diagram illustrating a configuration example of PDCCH-ConfigSIB1 included in the MIB.

DESCRIPTION OF EMBODIMENTS

Figure 1:
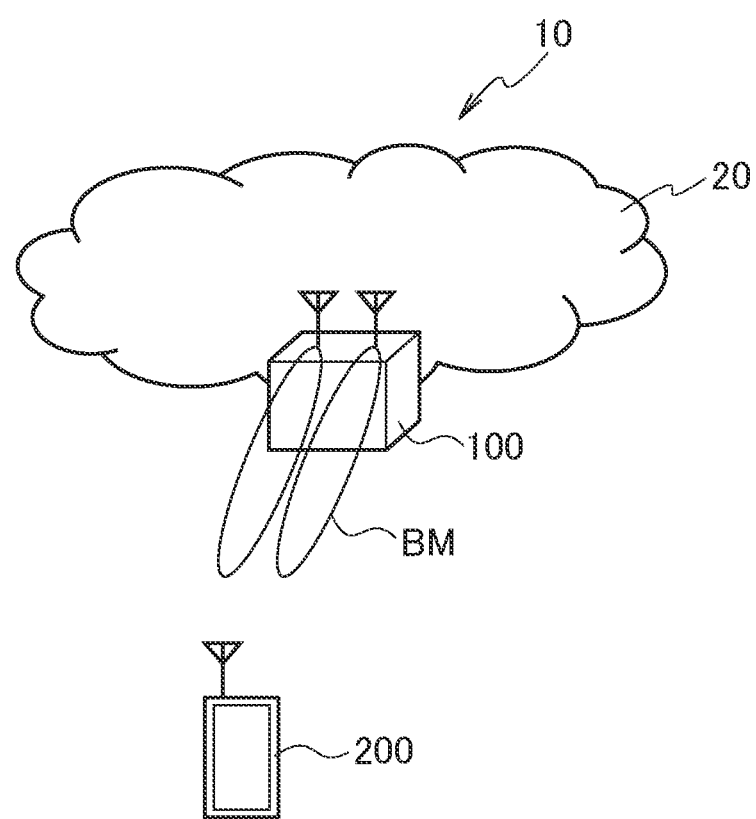
FIG. 1 is an overall schematic configuration diagram of a radio communication system 10.

Hereinafter, embodiments will be described with reference to the drawings. It should be noted that the same functions or configurations are denoted by the same or similar reference numerals, and a description thereof will be omitted as appropriate.

Like reference numerals are assigned and a description thereof will be appropriately omitted.

(1) Overall Schematic Configuration of Radio Communication System

FIG. 1 is an overall schematic configuration diagram of a radio communication system 10 according to the present embodiment. The radio communication system 10 is a radio communication system in accordance with 5G New Radio (NR) and includes a Next Generation-Radio Access Network 20 (hereinafter NG-RAN 20) and a terminal 200 (hereinafter UE 200).

The NG-RAN 20 includes a radio base station 100 (hereinafter gNB 100). It should not be noted that a specific configuration of the radio communication system 10, including the number of gNBs and the number of UEs, is not limited to the example illustrated in FIG. 1.

The NG-RAN 20 actually includes a plurality of NG-RAN nodes, specifically gNBs (or ng-eNBs), and is connected to a core network (5GC, not illustrated) in accordance with 5G. It should be noted that the NG-RAN 20 and the 5GC may be simply expressed as "network".

The gNB 100 is a 5G-compliant radio base station and performs 5G-compliant radio communication with the UE 200. The gNB 100 and 110 and the UE 200 can correspond to massive Multiple-Input Multiple-Output (MIMO) that generates beams BM with higher directivity by controlling radio signals transmitted from a plurality of antenna elements, Carrier Aggregation (CA) using a plurality of Component Carriers (CC), Dual Connectivity (DC) that simultaneously performs communication between the UE and each of two NG-RAN nodes, and the like.

Figure 2:
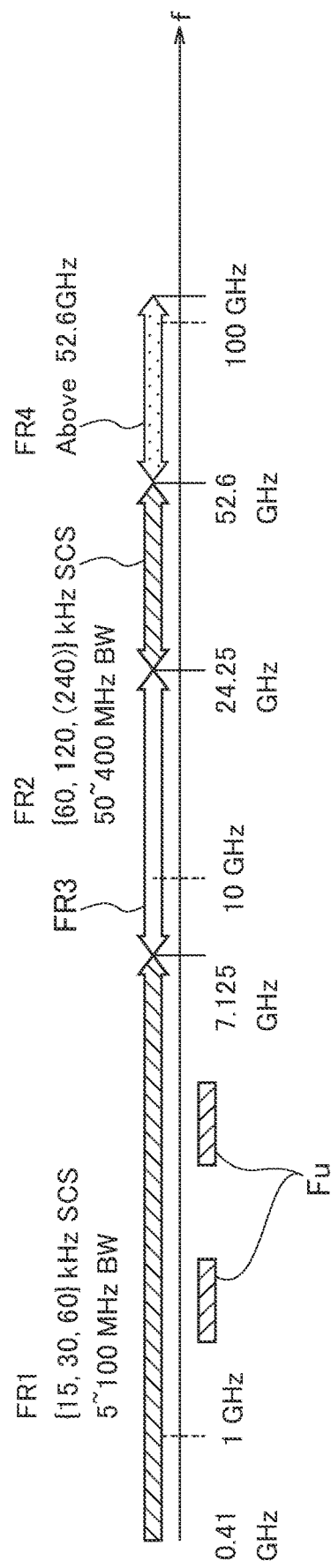
FIG. 2 is a diagram illustrating a frequency range used in the radio communication system 10.
Figure 3:
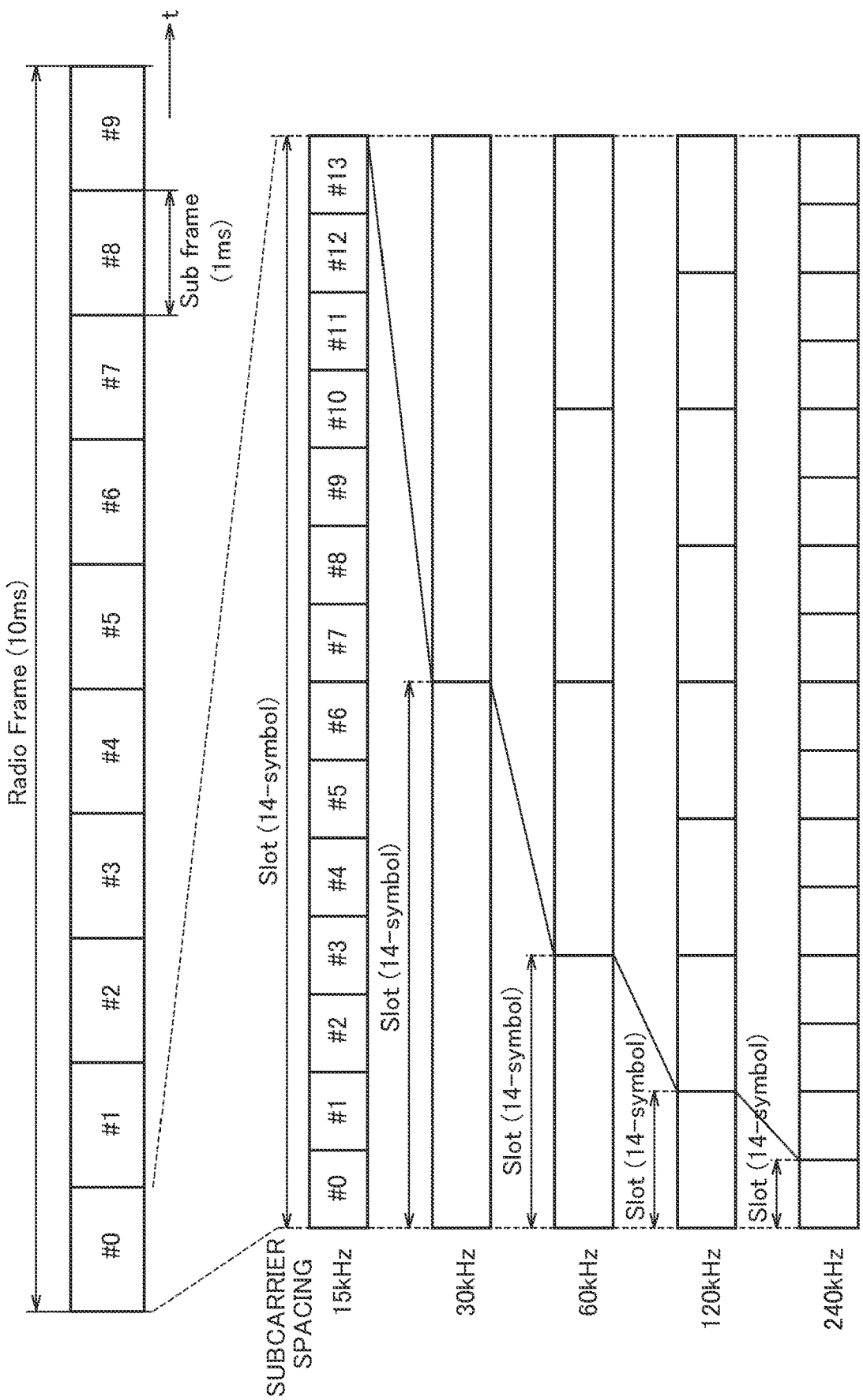
FIG. 3 is a diagram illustrating a configuration example of a radio frame, a subframe, and a slot used in the radio communication system 10.

The radio communication system 10 supports a plurality of frequency ranges (FR). FIG. 2 is a diagram illustrating the frequency range used in the radio communication system 10. Also, FIG. 3 is a diagram illustrating a configuration example of a radio frame, a subframe, and a slot used in the radio communication system 10.

As illustrated in FIG. 2, the radio communication system 10 supports FR1 and FR2. The frequency band of each FR is as follows.

FR1: 410 MHz to 7.125 GHz
FR2: 24.25 GHz to 52.6 GHz

In FR1, a Sub-Carrier Spacing (SCS) of 15, 30, or 60 kHz is used and a bandwidth of 5-100 MHz (BW) is used. FR2 has a higher frequency than FR1. An SCS of 60 or 120 kHz (240 kHz may be included) is used, and a bandwidth (BW) of 50 to 400 MHz is used.

It should be noted that the SCS may be interpreted as numerology. The numerology is defined in 3GPP TS 38.300 and corresponds to one subcarrier spacing in the frequency domain.

Furthermore, the radio communication system 10 may support a higher frequency band than the FR2 frequency band. For example, the radio communication system 10 may support a frequency band of above 52.6 GHz and up to 114.25 GHz. Here, such a high frequency band is called "FR4" for convenience. FR4 belongs to so-called EHF (extremely high frequency, also called millimeter wave). It should be noted that FR4 is a tentative name and may be called by another name.

Also, FR4 may be further divided. For example, FR4 may be divided into a frequency range of 70 GHz or lower and a frequency range of 70 GHz or higher. Alternatively, FR4 may be divided into more frequency ranges, or may be divided into frequencies other than 70 GHz.

Also, here, the frequency band between FR2 and FR41 is called "FR3" for convenience. FR3 is a frequency band of above 7.125 GHz and below 24.25 GHz.

In the present embodiment, FR3 and FR4 are different from the frequency band including FR1 and FR2 and are called different frequency bands.

Also, in the radio communication system 10, in addition to the frequency band allocated for the radio communication system 10, an unlicensed frequency band Fu different from the frequency band is also used. Specifically, the radio communication system 10 can perform New Radio-Unlicensed (NR-U) for extending the usable frequency band by using the spectrum of the unlicensed frequency band.

The frequency band allocated for the radio communication system 10 is a frequency band included in the frequency ranges of FR1 and FR2 described above and based on license allocation by the government.

The unlicensed frequency band Fu is a frequency band that does not need to be licensed by the government and can be used without being limited to specific telecommunications carriers. For example, there is a frequency band for wireless LAN (WLAN) (2.4 GHz or 5 GHz band, or the like).

In the unlicensed frequency band Fu, it is possible to install radio stations without being limited to specific telecommunications carriers, but it is not desirable that signals from neighboring radio stations interfere with each other to significantly deteriorate communication performance.

Therefore, for example, in Japan, as the requirements for the radio system using the unlicensed frequency band Fu (for example, 5 GHz band), the gNB 100 performs carrier sense before transmission starts, and only when it is confirmed that no channel is being used by other neighboring systems, a Listen-Before-Talk (LBT) mechanism that enables transmission within a certain time length is applied. It should be noted that carrier sense is a technique for confirming whether a frequency carrier is used for other communication before radio waves are emitted.

The LBT band (LBT sub-band) in the NR-U can be provided in the unlicensed frequency band Fu, and may be expressed as a band for confirming the presence or absence of use in the unlicensed frequency band Fu. The LBT sub-band may be, for example, 20 MHz, or may be 10 MHz that is ½ of 20 MHz, or 5 MHz that is ¼ of 20 MHz.

When the gNB 100 performs the carrier sense and confirms that no channel is being used by other neighboring systems, a reference signal for radio link monitoring, specifically, an RLM-RS (Radio link monitoring-Reference Signal) is transmitted toward a forming cell.

The RLM-RS may include DRS (Discovery Reference Signal), SSB (SS/PBCH blocks: Synchronization Signal/Physical Broadcast Channel blocks), and CSI-RS (Channel State Information-RS). Also, the DRS may include CSI-RS, RMSI-CORESET (remaining minimum system information-control resource sets), or PDSCH (Physical Downlink Shared Channel) associated with the SSB.

The RMSI-CORESET is CORESET (control resource sets: control resource set, which may be called Remaining Minimum System Information (RMSI) CORESET) for Type0-PDCCH CSS (Common Search Space) set, and the UE 200 determines several continuous resource blocks (RBs) and symbols for RMSI CORESET, and configures a monitoring occasion (MO) of a PDCCH (Physical Downlink Control Channel), specifically, a Type 0 PDCCH for decoding a system information block (SIB) based on the determined RBs and symbols.

Also, as shown in Tables 13-1 to 13-10 in 3GPP TS 38.213 v15/13 chapter, the UE 200 determines the number of consecutive resource blocks (RBs) and the number of consecutive symbols of RMSI CORESET from four most significant bits (controlResourceSetZero) of pdcch-ConfigSIB1 included in the master information block (MIB: Master Information Block), and determines the period or timing of the monitoring occasion (MO) of the PDCCH (including Type 0 PDCCH) from four least significant bits (searchSpaceZero) of pdcch-ConfigSIB1 included in the MIB. It should be noted that pdcch-ConfigSIB1 may be called RMSI-PDCCH-Config.

Also, the synchronization signal block (SSB) is used in the initial access in the NR-U as in 3GPP Release-15.

The SSB includes a synchronization signal (SS: Synchronization Signal) and a downlink physical broadcast channel (PBCH: Physical Broadcast CHannel).

The SS includes a primary synchronization signal (PSS: Primary SS) and a secondary synchronization signal (SSS: Secondary SS).

The PSS is a known signal that the UE 200 first attempts to detect in a cell search procedure. The SSS is a known signal transmitted to detect a physical cell ID in a cell search procedure.

The PBCH includes information necessary for the UE 200 to establish frame synchronization with the NR cell formed by the gNB 100 after detecting the SS/PBCH block such as the radio frame number (SFN: System Frame Number) and the index for identifying the symbol positions of a plurality of SS/PBCH blocks in the half frame (5 ms).

Also, the PBCH can include system parameters needed to receive system information (SIB). Furthermore, the SSB also includes a broadcast channel demodulation reference signal (DMRS for PBCH). The DMRS for PBCH is a known signal transmitted to measure the radio channel condition for PBCH demodulation.

The UE assumes that each SSB is associated with a different beam BM. That is, the UE assumes that each SSB is associated with a beam BM having a different transmission direction (coverage) (assuming quasi co-location). Therefore, the UE 200 that resides in the NR cell can receive any beam BM, acquire the SSB, and start initial access and SSB detection/measurement.

It should be noted that the SSB transmission pattern changes according to the SCS, frequency range (FR), or other parameters.

NR-U differs from Release 15 in the following points. Specifically, the SSB transmission candidate position is one frame (10 milliseconds). Therefore, the SSB transmission candidate position is #10 (when SCS=15 kHz, refer to the upper part of FIG. 2) and #20 (when SCS=30 kHz).

Also, the number of SSBs that are actually transmitted is the number of SSBs that are required continuously after successive LBT. Therefore, the actual SSB transmission timing may differ every time among the SSB transmission candidate positions depending on the success or failure of the LBT. Therefore, when the UE accurately recognizes a QCL, it is not necessary to perform SSB measurement at all SSB candidate positions, and the UE only needs to measure at the same QCL.

Also, in the case of NR-U, as will be described below, the relationship between SSB and quasi co-location (QCL: Quasi Co-Location) is determined by a certain deriving method.

It should be noted that, for example, when the characteristics of the channel carrying the symbols on one antenna port can be inferred from the channel carrying the symbols on the other antenna port, the two antenna ports are assumed to be in the same place in a quasi manner. The QCL may be called quasi co-location.

(2) Functional Block Configuration of Radio Communication System

Next, the functional block configuration of the radio communication system 10 will be described. Specifically, the functional block configuration of the UE 200 will be described.

Figure 4:
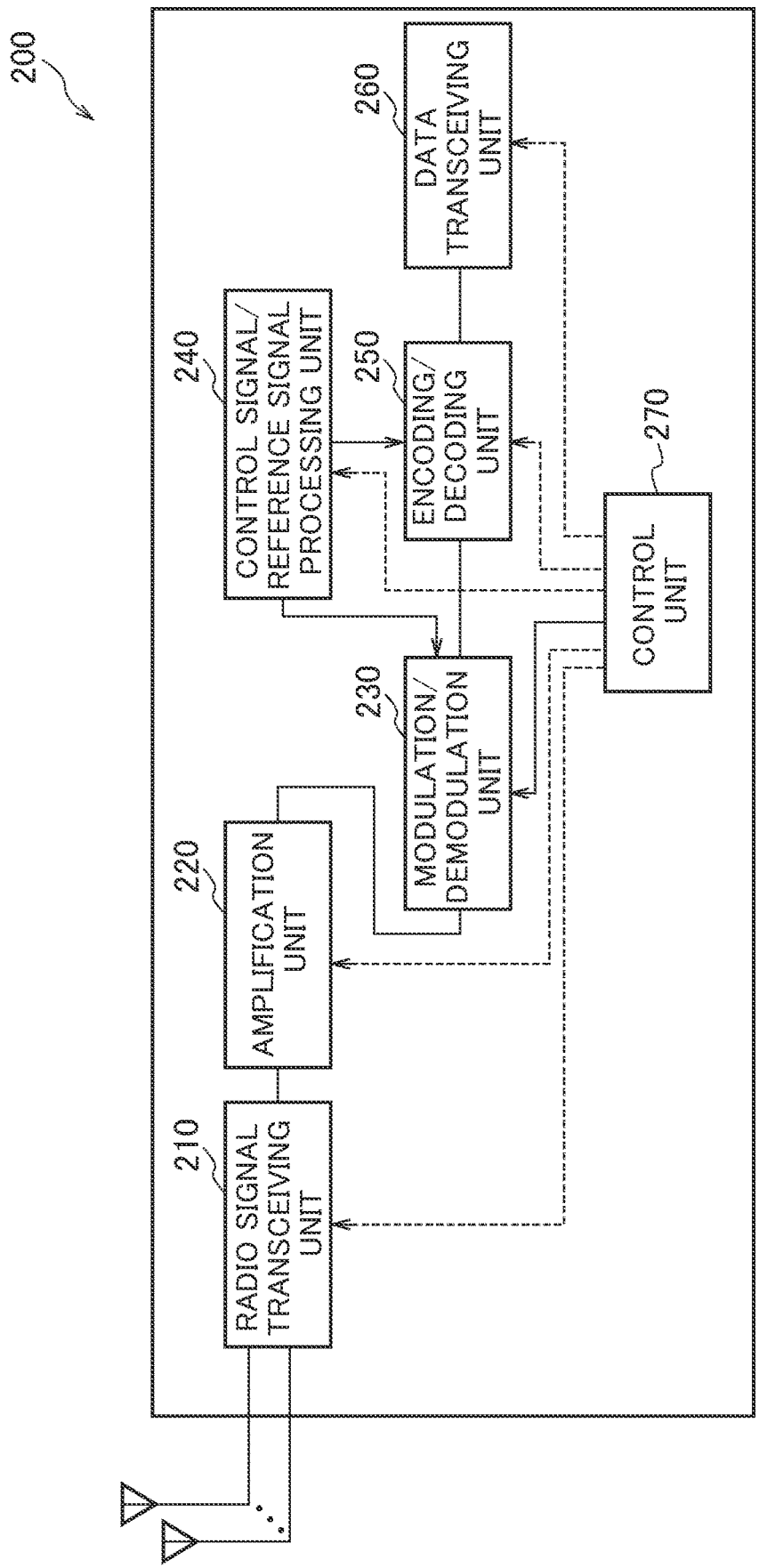
FIG. 4 is a functional block configuration diagram of a UE 200.

FIG. 4 is a functional block configuration diagram of the UE 200. As illustrated in FIG. 4, the UE 200 includes a radio signal transceiving unit 210, an amplification unit 220, a modulation/demodulation unit 230, a control signal/reference signal processing unit 240, an encoding/decoding unit 250, a data transceiving unit 260, and a control unit 270.

The radio signal transceiving unit 210 transmits or receives a radio signal in accordance with NR. The radio signal transceiving unit 210 corresponds to Massive MIMO, CA used by bundling a plurality of CCs, DC performing simultaneous communication between the UE and each of the two NG-RAN nodes, and the like.

The amplification unit 220 includes a PA (Power Amplifier)/LNA (Low Noise Amplifier) or the like. The amplification unit 220 amplifies a signal output from the modulation/demodulation unit 230 to a certain power level. Also, the amplification unit 220 amplifies an RF signal output from the radio signal transceiving unit 210.

The modulation/demodulation unit 230 performs data modulation/demodulation, transmission power setup, resource block allocation, and the like for each certain communication destination (gNB 100 or another gNB).

The control signal/reference signal processing unit 240 performs processing regarding various control signals transmitted and received by the UE 200 and processing regarding various reference signals transmitted and received by the UE 200.

Specifically, the control signal/reference signal processing unit 240 receives various control signals transmitted from the gNB 100 via a certain control channel, for example, control signals of a radio resource control layer (RRC). Also, the control signal/reference signal processing unit 240 transmits various control signals to the gNB 100 via a certain control channel.

The control signal/reference signal processing unit 240 performs processing using a reference signal (RS) such as a Demodulation Reference Signal (DMRS) and a Phase Tracking Reference Signal (PTRS).

The DMRS is a reference signal (pilot signal) known between a UE-specific base station and a UE for estimating a fading channel used for data demodulation. The PTRS is a UE-specific reference signal for the purpose of estimating phase noise, which is a problem in high frequency bands.

It should be noted that, in addition to the DMRS and the PTRS, the reference signal includes a Channel State Information-Reference Signal (CSI-RS) and a Sounding Reference Signal (SRS). Furthermore, the reference signal also includes the RLM-RS, as described above.

Also, the channel includes a control channel and a data channel. The control channel includes a Physical Downlink Control Channel (PDCCH), a Physical Uplink Control Channel (PUCCH), a Physical Random Access Channel (PRACH), and a Physical Broadcast Channel (PBCH).

Also, the data channel includes a Physical Downlink Shared Channel (PDSCH) and a Physical Uplink Shared Channel (PUSCH). Also, the data may mean data transmitted via the data channel.

The control signal/reference signal processing unit 240 receives a master information block and a synchronization signal block from the gNB 100. In the present embodiment, the control signal/reference signal processing unit 240 constitutes a receiving unit.

Specifically, the control signal/reference signal processing unit 240 can receive a Master Information Block (MIB). In addition to the MIB, the control signal/reference signal processing unit 240 can also receive a system information block, specifically, a System Information Block (SIB). It should be noted that the MIB and the SIB may be collectively called a system information block (or simply system information).

The encoding/decoding unit 250 performs data division/concatenation, channel coding/decoding, and the like for each certain communication destination (gNB 100 or another gNB).

Specifically, the encoding/decoding unit 250 divides data output from the data transceiving unit 260 into a certain size and performs channel coding on the divided data. Also, the encoding/decoding unit 250 decodes data output from the modulation/demodulation unit 230 and concatenates the decoded data.

The data transceiving unit 260 performs transmission/reception of Protocol Data Unit (PDU) and Service Data Unit (SDU). Specifically, the data transceiving unit 260 performs assembly/disassembly of PDUs/SDUs on a plurality of layers (medium access control layer (MAC), radio link control layer (RLC), packet data convergence protocol layer (PDCP), or the like). Also, the data transceiving unit 260 performs data error correction and retransmission control based on hybrid ARQ (Hybrid automatic repeat request).

The control unit 270 controls each functional block constituting the UE 200. In particular, in the present embodiment, the control unit 270 performs the control associated with the NR-U.

Specifically, when performing NR-U using the unlicensed frequency band Fu (may be called second frequency band, or unlicensed band) different from the frequency band (first frequency band) allocated for mobile communication, that is, the licensed frequency band (may be called licensed band), the control unit 270 assumes quasi co-location (QCL) associated with the SSB based on the parameters included in the MIB.

The control unit 270 may assume the QCL associated with the SSB based on the DMRS sequence (A) and the SSB position index (identification information of the position of the synchronization signal block).

The control unit 270 can acquire a parameter for QCL derivation included in the master information block (MIB). The parameter for QCL derivation associated with the SSB may be called Q (hereinafter called Q). It should be noted that the parameter may be simply called QCL estimation information or the like, or may be called by another name.

Q may have several values. For example, Q may have a value such as 1, 2, 4, or 8. In this case, 2 bits are required for Q notification from the network to the UE.

In the NR-U, the Q value of 1, 2, 4, and 8 may be supported in order to derive QCL associated with SSB.

Also, the maximum number of PBCH DMRS sequences (=8) used in a cell (serving cell or neighboring cell) has not changed from 3GPP Release 15. It should be noted that the number of PBCH DMRS sequences (may be simply called DMRS sequences) used in the cell does not depend on Q.

Three least significant bits (LSB) of the SSB candidate position index are represented by the DMRS sequence index.

Also, when recognizing the value of Q, the control unit 270 can assume a DRS (Discovery Reference Signal) transmission having modulo (A, Q) having the same value or a QCL relationship between SSBs in a measurement window.

The control unit 270 acquires an offset between SSB and CORESET (control resource set) using the parameter (Q). The CORESET may be interpreted as a set of physical resources (a specific area on the NR downlink resource grid) and a set of parameters used to transmit PDCCH/DCI (Downlink Control Information).

Here, the CORESET acquired by the control unit 270 may be a special CORESET called CORESET #0.

CORESET #0 may be interpreted as CORESET transmitting a PDCCH for SIB1 scheduling. Although many parameters are involved in the definition of CORESET, these parameters may be specified by an RRC message. Since CORESET #0 is used before transmitting the RRC message, it may not be possible to specify CORESET #0 by the RRC message.

The offset between SSB and CORESET (CORESET #0) may be indicated in physical resource block (PRB) W units. Alternatively, a resource element (RE), a resource element group (REG), or the like may be used as the unit. Also, the offset may correspond to $k_{SSB}$, as described below. The control unit 270 assumes the QCL associated with the SSB based on the acquired offset.

It should be noted that the parameter (Q) may be included in the field for CORESET of MIB. Specifically, Q may be included in controlResourceSetZero.

The control unit 270 may change an assuming method of the QCL associated with the SSB according to the acquired offset value. For example, the assumption of the QCL associated with the SSB is changed according to the magnitude of the value of $k_{SSB}$ indicating the offset. A detailed QCL assuming method will be described below. It should be noted that the QCL may be read as "deriving" instead of "assuming".

Also, the MIB may include a parameter (Q) for QCL derivation and an offset between SSB and CORESET (CORESET #0). That is, the MIB may include both Q and offset ($k_{SSB}$).

Therefore, the control unit 270 may assume the QCL associated with the SSB based on the parameter for QCL derivation included in the MIB and the offset between SSB and CORESET included in the MIB.

Also, in this case, the parameter (Q) and the offset ($k_{SSB}$) may be included in the field for subcarrier offset of SSB. Specifically, Q and $k_{SSB}$ may be included in ssb-SubcarrierOffset.

Alternatively, the parameter (Q) for QCL derivation may be notified to the UE 200 over a plurality of fields constituting the MIB. That is, the parameter (Q) for QCL derivation may be notified by using two or more fields among the fields constituting the MIB.

In this case, the control unit 270 can assume the QCL associated with the SSB by using the parameter (Q) for QCL derivation that is included over the plurality of fields constituting the MIB. It should be noted that an example of a specific field used for notification of the parameter (Q) in this case will be described below.

(3) Operation of Radio Communication System

Next, the operation of the radio communication system 10 will be described. Specifically, in the NR-U, the operation in which the UE 200 assumes the QCL associated with the SSB will be described.

As described above, in the present embodiment, the parameter (Q) used for deriving the QCL of the SSB is notified from the network (specifically, gNB 100) to the UE 200 by using the MIB.

(3.1) Configuration Example of Master Information Block (MIB)

First, the configuration example of the MIB used for notifying the parameter (Q) used for deriving the QCL of the SSB will be described.

FIG. 5 illustrates the configuration example of the MIB. Also, FIG. 6 illustrates a configuration example of PDCCH-ConfigSIB1 included in the MIB. The configurations of MIB and PDCCH-ConfigSIB1 are specified in 3GPP TS 38.331.

The MIB may include system information transmitted by BCH (Broadcast Channel). PDCCH-ConfigSIB1 can determine common ControlResourceSet (CORESET #0), Common Search Space, and required PDCCH parameters. When ssb-SubcarrierOffset indicates that SIB1 does not exist, PDCCH-ConfigSIB1 may indicate the frequency location at which the UE 200 can find SSB in SIB1 or the frequency range in which the network does not provide SSB in SIB1.

In the case of the NR-U, the bits of the next field included in the MIB may be used for Q notification.

controlResourceSetZero in PDCCH-ConfigSIB1: 1 or 2 bits searchSpaceZero in PDCCH-ConfigSIB1: 1 bit ssb-SubcarrierOffset: 1 bit subCarrierSpacingCommon: 1 bit spare: 1 bit

(3.2) Configuration of controlResourceSetZero

As described above, in the case of the NR-U, since 1, 2, 4, and 8 can be supported as the value of Q, 2 bits are required for Q notification. Therefore, when 2 bits of controlResourceSetZero can be secured, Q is preferably notified by using controlResourceSetZero.

Regarding controlResourceSetZero (4 bits), in the case of the NR-U, the following configuration is conceivable, and it is desirable to create tables for NR-U (3GPP TSTS 38.213 Tables 13-1 to 13-10).

SS/PBCH block and CORESET multiplexing pattern: 1

Number of CORESET RBs: 48 (30 kHz SCS), 96 (15 kHz SCS)

Number of CORESET Symbols: 1 or 2

Here, when the offset ($k_{SSB}$, PRBs) between SSB and CORESET (CORESET #0) is binary (1 bit), Q can be notified only by controlResourceSetZero. However, regarding the value of the offset, it is necessary to consider the configurations of the channel raster and the synchronization raster.

The channel raster defines a subset of RF reference frequencies (FREF) that can be used to identify uplink (UL) and downlink (DL) radio frequency (RF) channel positions. Also, the synchronization raster can indicate the frequency position of the SSB that can be used by the UE for system information acquisition when there is no explicit signaling of the synchronization signal block position.

Table 1 shows a configuration example (SCS=30 kHz) of controlResourceSetZero when the offset is binary.

TABLE 1

| Index | SS/PBCH block and CORESET multiplexing pattern | Number of CORESETRBs | Number of CORESET Symbols | Offset (RBs) | Q |
|---|---|---|---|---|---|
| 0 | 1 | 48 | 1 | 0 | 1 |
| 1 | 1 | 48 | 2 | 0 | 1 |
| 2 | 1 | 48 | 1 | 0 | 2 |
| 3 | 1 | 48 | 2 | 0 | 2 |
| 4 | 1 | 48 | 1 | 0 | 4 |
| 5 | 1 | 48 | 2 | 0 | 4 |
| 6 | 1 | 48 | 1 | 0 | 8 |
| 7 | 1 | 48 | 2 | 0 | 8 |
| 8 | 1 | 48 | 1 | 2 | 1 |
| 9 | 1 | 48 | 2 | 2 | 1 |
| 10 | 1 | 48 | 1 | 2 | 2 |
| 11 | 1 | 48 | 2 | 2 | 2 |
| 12 | 1 | 48 | 1 | 2 | 4 |
| 13 | 1 | 48 | 2 | 2 | 4 |
| 14 | 1 | 48 | 1 | 2 | 8 |
| 15 | 1 | 48 | 2 | 2 | 8 |

Considering the configurations of the channel raster and the synchronous raster for the NR-U, there are five SSB arrangements in the frequency direction for SSB and two for CORESET #0.

Figure 7:
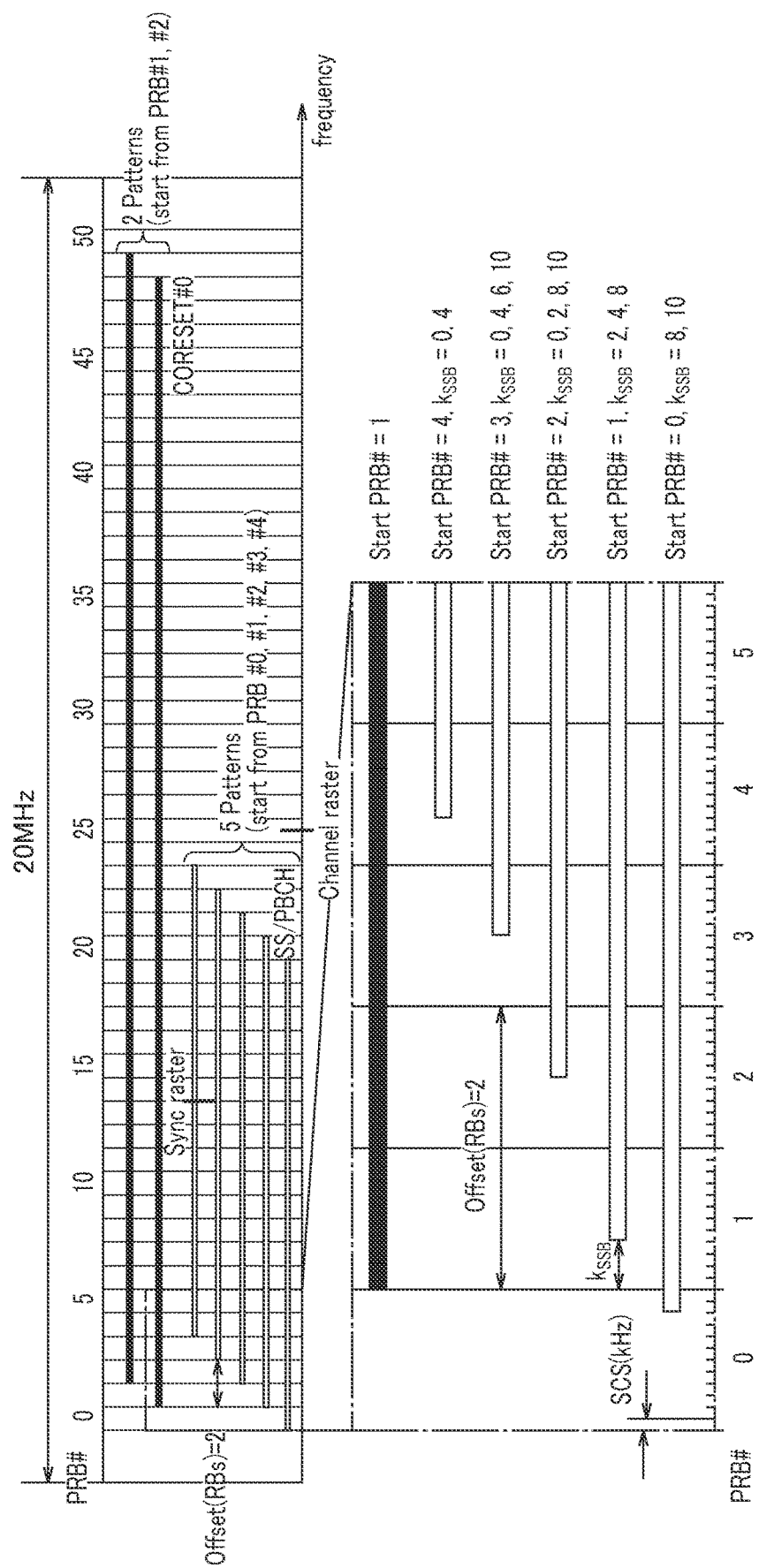
FIG. 7 is a diagram illustrating an arrangement example of CORESET #0 and SSB in a frequency direction for NR-U.

FIG. 7 illustrates an arrangement example of CORESET #0 and SSB in the frequency direction for the NR-U. The upper part of FIG. 7 illustrates the overall configuration of the pattern of CORESET #0 and SSB, and the lower part of FIG. 7 illustrates the part of PRB #0 to 5 in an enlarged manner.

As illustrated in FIG. 7, CORESET #0 can have two patterns starting from PRB #1 or PRB #2. Also, SSB (SS/PBCH) may have five patterns starting from PRB #0, 1, 2, 3, and 4. It should be noted that that FIG. 7 illustrates an example of SCS=30 kHz (hereinafter, the same applies) Also, $k_{SSB}$ in the drawing indicates the offset (PRB) from the reference position (raster position) in units of SCS=15 kHz.

When the offset ($k_{SSB}$) between SSB and CORESET #0 is determined following 3GPP Release-15 (TS 38.213 Chapter 13), the displaying of the offset requires three values as shown below.

Offset=0: (SSB, CORESET #0)=(#1, #1), (#2, #2),

Offset=2: (SSB, CORESET #0)=(#3, #1), (#4, #2)

Offset=−1: (SSB, CORESET #0)=(#0, #1)

(3.3) Parameter (Q) Notification Operation

Hereinafter, for the NR-U, three operation examples of notifying the parameter (Q) used for deriving the QCL of the SSB by using the MIB will be described.

(Operation Example 1) Notification Using 2 Bits in controlResourceSetZero

In this case, the deriving method of the offset value between SSB and CORESET #0 is changed.

(Operation Example 2) Notification Using Ssb-SubcarrierOffset

In this case, $k_{SSB}$ and Q are combined and notified by using ssb-Subcarrier Offset.

(Operation Example 3) Notification Using Plurality of Fields of MIB

In this case, two or more fields are combined and notified.

(3.3.1) Operation Example 1

In this operation example, it is possible to make the offset value binary by changing the deriving method of the offset value between SSB and CORESET #0. Therefore, 2 bits of controlResourceSetZero can be used for Q notification.

Figure 8:
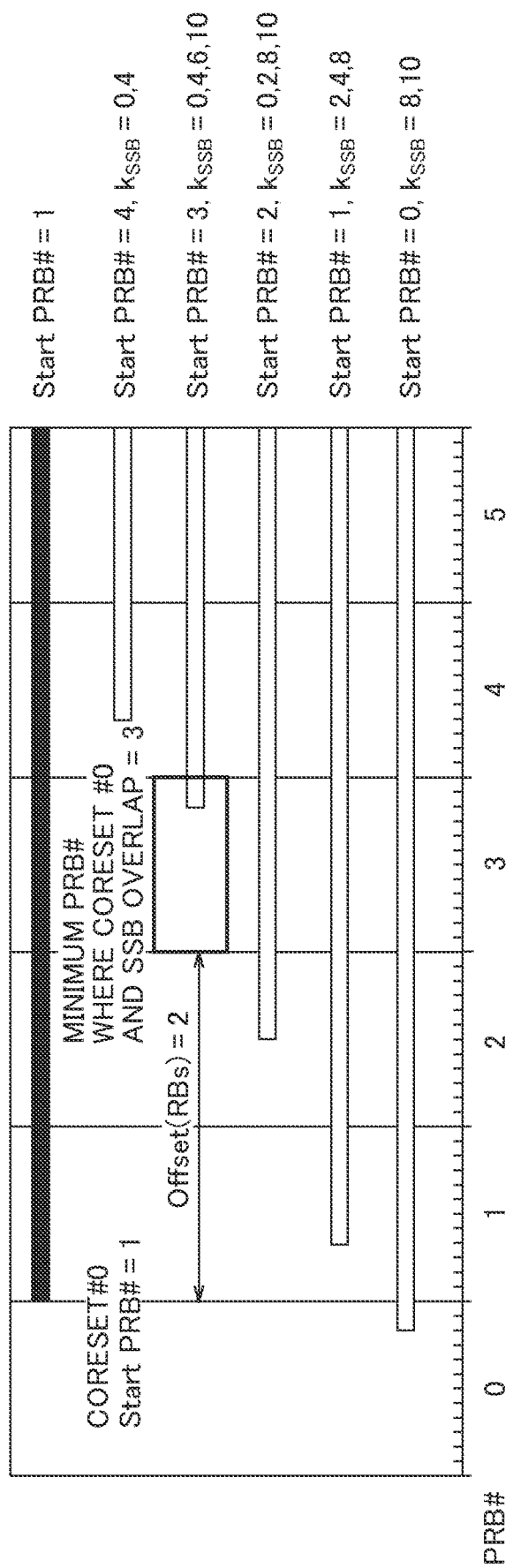
FIG. 8 is a diagram illustrating an example of arrangement (PRB position) of CORESET #0 and SSB in a frequency direction for NR-U specified in 3GPP Release-15.

FIG. 8 illustrates an example of arrangement (PRB position) of CORESET #0 and SSB in a frequency direction for NR-U specified in 3GPP Release-15.

Specifically, in the arrangement example illustrated in FIG. 8, the offset value ($k_{SSB}$) between SSB and CORESET #0 is derived according to the provisions of Chapter 13 of TS 38.213. More specifically, $k_{SSB}$ is derived according to the following rules.

"The offset in Tables 13-1 through 13-10 is defined with respect to the SCS of the CORESET for Type0-PDCCH CSS set, provided by subCarrierSpacingCommon, from the smallest RB index of the CORESET for Type0-PDCCH CSS set to the smallest RB index of the common RB overlapping with the first RB of the corresponding SS/PBCH block".

In the arrangement example illustrated in FIG. 8, CORESET #0 starts from PRB #1. When focusing on SSB of Start PRB #3, the smallest PRB where CORESET #0 and SSB overlap in the frequency direction is #3, and the offset value ($k_{SSB}$, RBs) is "2" ((SSB, CORESET #0)=(#3, #1)).

Figure 9:
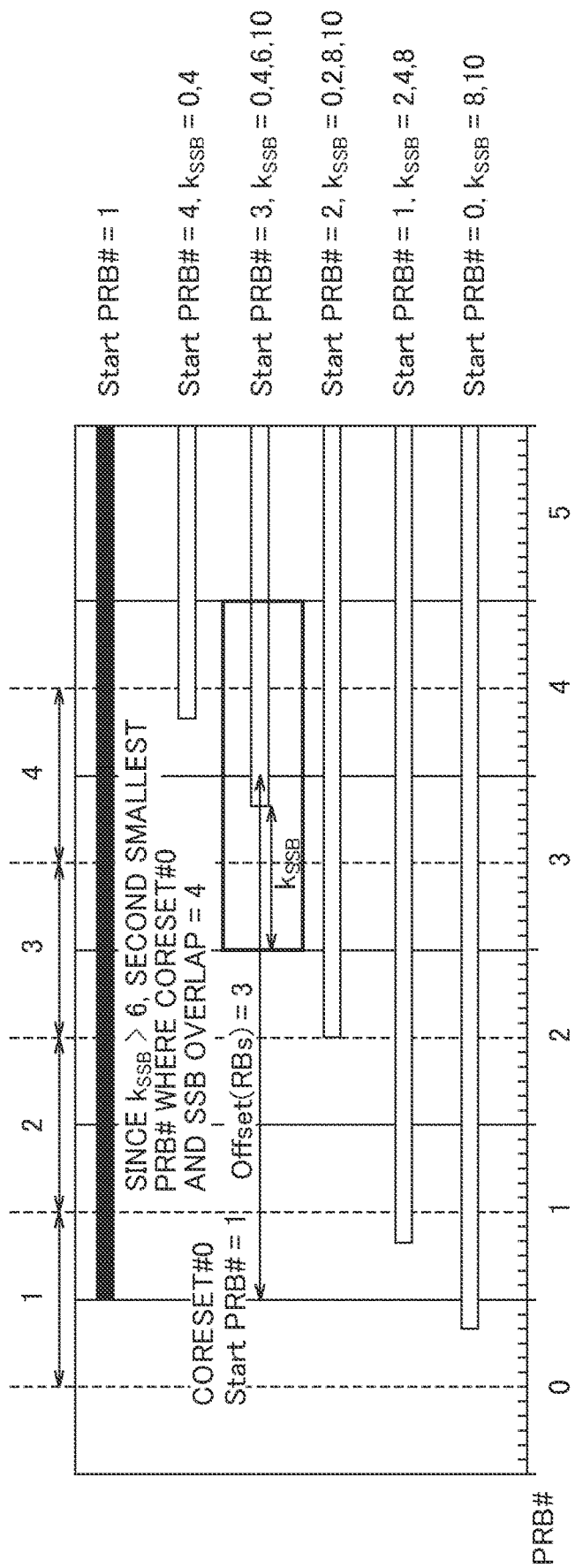
FIG. 9 is an explanatory diagram of a change in a deriving method of an offset value between SSB and CORESET #0 in the example of the arrangement (PRB position) of CORESET #0 and SSB in the frequency direction.

FIG. 9 is an explanatory diagram of a change in a deriving method of an offset value between SSB and CORESET #0 in the example of the arrangement (PRB position) of CORESET #0 and SSB in the frequency direction.

As illustrated in FIG. 9, the PRB Index setup is changed. In the example illustrated in FIG. 8, the absolute PRB indexes (#0 to 5) are used regardless of the start positions of SSB and CORESET #0, but in FIG. 9, the PRB indexes (1 to 4) illustrated in the upper part are used.

When the index of the PRB can be classified by the value of $k_{SSB}$ and $k_{SSB} \geq 6$, the first (minimum index value) RB of the corresponding SSB (SS/PBCH) may be interpreted as the index of the common RB overlapping with CORESET #0. When $k_{SSB} < 6$, the second smallest RB of the corresponding SSB (SS/PBCH) may be interpreted as the index of the common RB overlapping with CORESET #0.

That is, when $k_{SSB} \geq 6$, it may be interpreted as an index with the RB having the smallest SSB value that overlaps CORESET #0 in the frequency direction as reference. Also, when $k_{SSB} < 6$, it may be interpreted as an index with the RB having the second smallest value of SSB overlapping CORESET #0 in the frequency direction as reference.

Therefore, when focusing on the SSB of Start PRB #3, the offset value ($k_{SSB}$, RBs) is "2" when the start position of CORESET #0 is #2. According to such an offset value deriving method, the offset value ($k_{SSB}$) can be binary (0 or 2) (the SSB offset value of Start PRB #2 may be 0 or 2).

In the case of such an offset value deriving method, it may be specified as follows in accordance with the definition of TS 38.213 Chapter 13.

"The offset in Tables 13-1 through 13-10 is defined with respect to the SCS of the CORESET for Type0-PDCCH CSS set, provided by subCarrierSpacingCommon, from the smallest RB index of the CORESET for Type0-PDCCH CSS set to the smallest RB index if kSSB is less than 6, or the 2nd smallest RB index if kSSB is larger than or equal to 6, of the common RB overlapping with the first RB of the corresponding SS/PBCH block".

Here, as described in "if kSSB is less than 6, or the 2nd smallest RB index if kSSB is larger than or equal to 6", when $k_{SSB}$ is 6 RB or more, the offset value of the PRB of the SSB having the second smallest value where the SSB and CORESET #0 overlap is used (see the solid line frame of Start PRB #=3 in FIG. 9).

When the offset value ($k_{SSB}$) is "6", the smallest RB index may be used as the reference, or the second smallest RB index may be used as the reference.

(3.3.2) Operation Example 2

In this operation example, regarding the offset value ($k_{SSB}$), in the case of the NR-U, it is assumed that SCSs of SSB and CORESET #0 are the same.

Table 2 shows examples of combinations of RB index, $k_{SSB}$, and Q.

TABLE 2

| Index | $k_{SSB}$ | Q |
|---|---|---|
| 0 | 0 | 1 |
| 1 | 2 | 1 |
| 2 | 4 | 1 |
| 3 | 6 | 1 |
| 4 | 8 | 1 |
| 5 | 10 | 1 |
| 6 | 0 | 2 |
| 7 | 2 | 2 |
| 8 | 4 | 2 |
| 9 | 6 | 2 |
| 10 | 8 | 2 |
| 11 | 10 | 2 |
| 12 | 0 | 4 |
| 13 | 2 | 4 |
| 14 | 4 | 4 |
| 15 | 6 | 4 |
| 16 | 8 | 4 |
| 17 | 10 | 4 |
| 18 | 0 | 8 |
| 19 | 2 | 8 |
| 20 | 4 | 8 |
| 21 | 6 | 8 |
| 22 | 8 | 8 |
| 23 | 10 | 8 |

As shown in Table 2, the value of $k_{SSB}$ can be notified by 12 values from 0 to 11. Furthermore, since it is agreed that the value of $k_{SSB}$ takes six values of 0, 2, 4, 6, 8, and 10, $k_{SSB}$ and Q can be notified by using ssb-SubcarrierOffset. The value of $k_{SSB}$ is not necessarily limited to the 6 values of 0, 2, 4, 6, 8, and 10 and may be different. Also, as described above, Q is a parameter used for deriving the QCL of the SSB, but it may be called by another name.

(3.3.3) Operation Example 3

In this operation example, the parameter (Q) is notified by using a plurality of fields of the MIB. Specifically, Q is notified by combining two of the following fields in the MIB.

controlResourceSetZero in PDCCH-ConfigSIB1 searchSpaceZero in PDCCH-ConfigSIB1 ssb-SubcarrierOffset subCarrierSpacingCommon spare

For example, as illustrated in Table 3, the Q value may be mapped in a 2-bit table, and the LSB (least significant bit) and the MSB (most significant bit) may be notified by using separate fields.

TABLE 3

| Q | LSB | MSB |
|---|-----|-----|
| 1 | 0   | 0   |
| 2 | 0   | 1   |
| 4 | 1   | 0   |
| 8 | 1   | 1   |

(4) Operation and Effect

According to the above-described embodiment, the following effects can be obtained. Specifically, the UE 200 can acquire the offset ($k_{SSB}$) between the SSB and CORESET #0 by using the parameter (Q) for deriving the QCL included in the MIB, and can assume the QCL associated with the SSB based on the acquired offset.

Therefore, the UE 200 can quickly acquire the parameter Q used for deriving the QCL of the SSB by using the MIB, and can achieve good initial access even in the NR-U.

In the present embodiment, the parameter (Q) can be included in controlResourceSetZero. The UE 200 can change the assuming method of the QCL associated with the SSB according to the offset value. Therefore, even when the number of bits of controlResourceSetZero is limited, the UE 200 can reliably assume the QCL associated with the SSB by changing the QCL assuming method according to the offset value.

Also, the UE 200 can acquire the parameter (Q) included in the MIB and the offset ($k_{SSB}$) between SSB and CORESET #0 included in the MIB, and can assume the QCL associated with the SSB. Therefore, the UE 200 can realize good initial access even in the NR-U based on the parameter (Q) and the offset ($k_{SSB}$) acquired via the MIB.

In the present embodiment, the parameter (Q) and the offset ($k_{SSB}$) can be included in ssb-SubcarrierOffset. Therefore, the UE 200 can be notified of the parameter (Q) and the offset ($k_{SSB}$) efficiently and reliably while using the MIB.

Furthermore, the UE 200 can also acquire the parameter (Q) included over a plurality of fields constituting the MIB. Therefore, the UE 200 can realize good initial access even in the NR-U based on the parameter (Q) and the offset ($k_{SSB}$) acquired via the MIB.

(5) Other Embodiments

Although the contents of the present invention have been described with reference to the embodiments, the present invention is not limited to these descriptions, and it will be obvious to those skilled in the art that various modifications and improvements can be made thereto.

For example, the parameter (Q) may be called by another name such as QCL estimation information or QCL derivation parameter, as described above.

In the above-described embodiment, the parameter (Q) or the like is notified by using the master information block, but the parameter (Q) or the like may be notified by using other system information (SIB).

Also, the unlicensed frequency band may be called by a different name. For example, the terms such as License-exempt or Licensed-Assisted Access (LAA) may be used.

Furthermore, the block configuration diagrams (FIG. 4) used to describe the above-described embodiments illustrate blocks of functional units. Those functional blocks (structural components) can be realized by a desired combination of at least one of hardware and software. Method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. For example, a functional block (structural component) that causes transmitting may be called a transmitting unit or a transmitter. For any of the above, as explained above, the realization method is not particularly limited to any one method.

Figure 10:
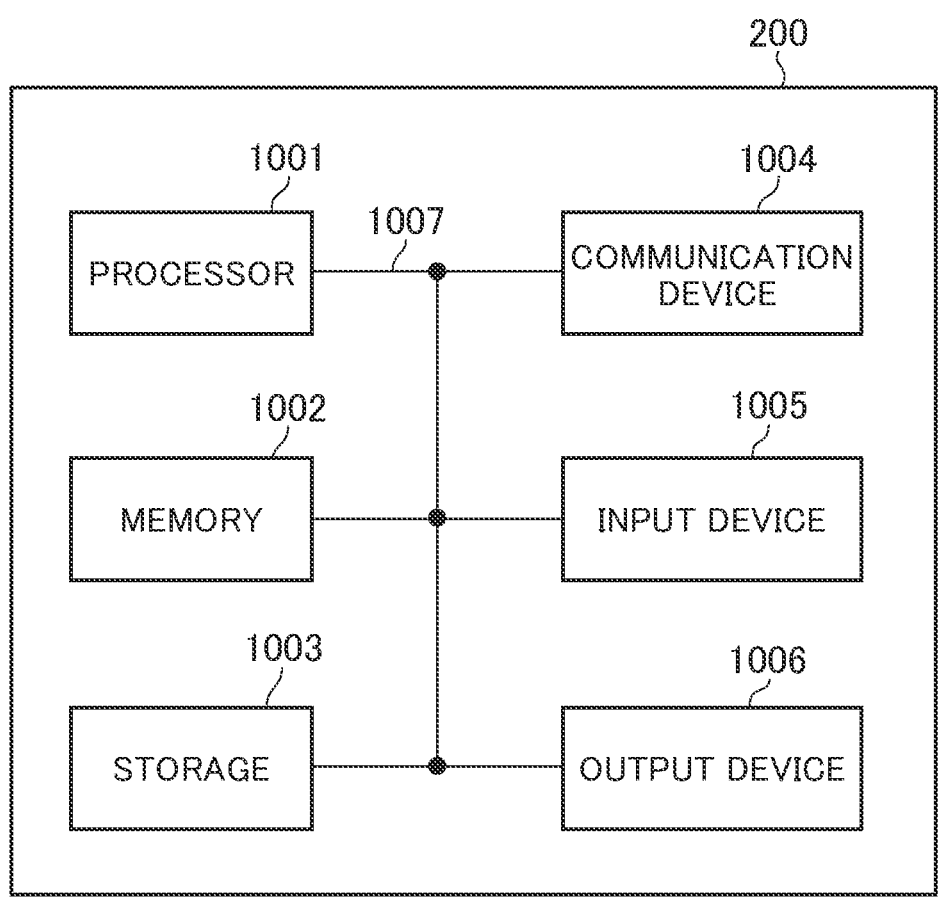
FIG. 10 is a diagram illustrating an example of a hardware configuration of a UE 200.

Furthermore, the UE 200 described above can function as a computer that performs the processing of the radio communication method of the present disclosure. FIG. 10 is a diagram illustrating an example of a hardware configuration of the UE 200. As illustrated in FIG. 10, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks of the UE 200 (see FIG. 4) can be realized by any of hardware elements of the computer device or a combination of the hardware elements.

Moreover, the processor 1001 performs computing by loading a predetermined software (computer program) on hardware such as the processor 1001 and the memory 1002, and realizes various functions of the device by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (computer program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EE- PROM), Random Access Memory (UM), and the like. The memory 1002 can be called register, cache, main memory (main storage device), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 may be configured by using a single bus or may be configured by using different buses for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, broadcasting information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, computer program code, computer program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The radio frame may include one or more frames in the time domain. Each of one or more frames in the time domain may be called a subframe.

The subframe may also include one or more slots in the time domain. The subframe may have a fixed time length (for example, 1 ms) that does not depend on numerology.

The numerology may be a communication parameter applied to transmission and/or reception of a certain signal or channel. The numerology may indicate, for example, at least one of subcarrier spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols (Orthogonal Frequency Division Multiplexing (OFDM) symbols, Single Carrier Frequency Division Multiple Access (SC-FDMA) symbols or the like) in the time domain. The slot may be the time unit based on the numerology.

The slot may include a plurality of minislots. Each minislot may include one or more symbols in the time domain. The minislot may also be called a subslot. The minislot may include fewer symbols than the slot. The PDSCH (or PUSCH) transmitted in the time unit larger than the minislot may be called PDSCH (or PUSCH) mapping type A. The PDSCH (or PUSCH) transmitted by using the minislot may be called PDSCH (or PUSCH) mapping type B.

The radio frame, the subframe, the slot, the minislot, and the symbol all represent the time unit for signal transmission. The radio frame, the subframe, the slot, the minislot, and the symbol may have different names corresponding thereto.

For example, one subframe may be called the transmission time interval (TTI), the plurality of consecutive subframes may be called the TTI, and one slot or one minislot may be called the TTI. That is, at least one of the subframe and the TTI may be a subframe (1 ms) in the existing LTE, may be shorter than 1 ms (for example, 1-13 symbols), and may be longer than 1 ms. It should be noted that the unit indicating the TTI may be called the slot, the minislot, or the like, instead of the subframe.

Here, the TTI refers to, for example, the minimum time unit of scheduling in the radio communication. For example, in the LTE system, the base station performs scheduling for allocating radio resources (frequency band width usable in each UE, transmission power, or the like) to each UE in the units of TTI. The definition of the TTI is not limited thereto.

The TTI may be a transmission time unit of a channel-encoded data packet (transport block), a code block, a codeword, or the like, or may be a processing unit such as scheduling or link adaptation. It should be noted that, when the TTI is given, the time interval (for example, the number of symbols) in which the transport block, code block, codeword, or the like are actually mapped may be shorter than that of the TTI.

It should be noted that, when one slot or one minislot is called the TTI, one or more TTIs (that is, one or more slots or one or more minislots) may be the minimum time unit of scheduling. Also, the number of slots (number of minislots) that constitutes the minimum time unit of the scheduling may be controlled.

The TTI having a time length of 1 ms may be called normal TTI (TTI in LTE Rel. 8-12), normal TTI, long TTI, normal subframe, normal subframe, long subframe, slot, or the like. The TTI that is shorter than the normal TTI may be called shortened TTI, short TTI, partial TTI (or fractional TTI), shortened subframe, short subframe, minislot, subslot, slot, or the like.

It should be noted that long TTI (for example, normal TTI, subframe, or the like) may be replaced with a TTI having a time length exceeding 1 ms, and the short TTI (for example, shortened TTI) may be read as a TTI having a TTI length that is less than the long TTI length and greater than or equal to 1 ms.

The resource block (RB) is a resource allocation unit in the time domain and the frequency domain, and may include one or more consecutive subcarriers in the frequency domain. The number of subcarriers included in the RB may be the same regardless of the numerology and may be, for example, 12. The number of subcarriers included in the RB may be determined based on the numerology.

Also, the time domain of the RB may include one or more symbols and may have a length of one slot, one minislot, one subframe, or one TTI. One TTI, one subframe, or the like may include one or more resource blocks.

It should be noted that one or more RBs may be called a physical resource block (Physical RB: PRB), a subcarrier group (Sub-Carrier Group: SCG), a resource element group (Resource Element Group: REG), a PRB pair, an RB pair, or the like.

Also, the resource block may include one or more resource elements (Resource Element: RE). For example, one RE may be a radio resource area of one subcarrier and one symbol.

The bandwidth part (BWP) (may be called partial bandwidth) may indicate a subset of continuous common RBs (common resource blocks) for a certain numerology in a certain carrier. Here, the common RB may be specified by the index of the RB based on the common reference point of the carrier. The PRB may be defined in the BWP and may be numbered in the BWP.

The BWP may include a BWP for UL (UL BWP) and a BWP for DL (DL BWP). One or more BWPs may be configured in one carrier for the UE.

At least one of the configured BWPs may be active, and the UE may not expect to transmit or receive certain signals/channels outside the active BWP. It should be noted that "cell", "carrier", or the like in the present disclosure may be read as "BWP".

The structures of the radio frame, the subframe, the slot, the minislot, the symbol, and the like described above are merely examples. For example, the configurations such as the number of subframes included in the radio frame, the number of slots per subframe or radio frame, the number of minislots included in the slot, the number of symbols and RBs included in the slot or minislot, the number of subcarriers included in the RB, and the number of symbols in the TTI, the symbol length, and the cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each device may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The term "deciding" and "determining" as used in the present disclosure may encompass various operations. The "deciding" and the "determining" may include, for example, "deciding" or "determining" of judging, calculating, computing, processing, deriving, investigating, looking up, search, inquiry (for example, searching in a table, a database, or another data structure), ascertaining, and the like. Also, the "deciding" and the "determining" may include "deciding" and "determining" of receiving (for example, receiving information), transmitting (for example, transmitting information), input, output, accessing (for example, access to data in the memory), and the like. Also, the "deciding" and the "determining" may include "deciding" and "determining" of resolving, selecting, choosing, establishing, comparing, and the like. That is, the "deciding" and the "determining" may include "deciding" and "determining" of operations. Also, the "deciding (determining)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100 gNB
200 UE
210 Radio signal transceiving unit
220 Amplification unit
230 Modulation/demodulation unit
240 Control signal/reference signal processing unit
250 Encoding/decoding unit
260 Data transceiving unit
270 Control unit
1001 Processor
1002 Memory
1003 Storage
1004 Communication device
1005 Input device
1006 Output device
1007 Bus

The invention claimed is:

1. A terminal comprising:
a receiver configured to receive a master information block from a network; and
a processor configured to acquire a parameter for quasi co-location derivation for an unlicensed frequency band by a part of bits indicating a synchronization signal block subcarrier offset and a bit indicating a common subcarrier spacing included in the master information block,
wherein the parameter for quasi co-location derivation is mapped to a table including a bit combination of the part of the bits indicating the synchronization signal block subcarrier offset and the bit indicating the common subcarrier spacing, and
wherein the processor assumes values of the parameter for quasi co-location derivation by using the table for combinations of bits included in the master information block received in the unlicensed frequency band.

2. The terminal according to claim 1, wherein the processor is configured to use one bit within the bits indicating the synchronization signal block subcarrier offset.

3. A radio base station comprising:
a processor configured to configure a master information block; and
a transmitter configured to transmit the master information block to a terminal,
wherein the transmitter notifies a parameter for quasi co-location derivation for an unlicensed frequency band by a part of bits indicating a synchronization signal block subcarrier offset and a bit indicating a common subcarrier spacing included in the master information block,
wherein the parameter for quasi co-location derivation is mapped to a table including a bit combination of the part of the bits indicating the synchronization signal block subcarrier offset and the bit indicating the common subcarrier spacing, and
wherein the terminal is made to assume values of the parameter for quasi co-location derivation by using the table for combinations of bits included in the master information block received in the unlicensed frequency band.

4. A radio communication method comprising:
receiving a master information block from a network;
acquiring a parameter for quasi co-location derivation for an unlicensed frequency band by one bit within bits indicating a synchronization signal block subcarrier offset and a bit indicating a common subcarrier spacing included in the master information block; and
assuming values of the parameter for quasi co-location derivation by using a table for combinations of bits included in the master information block received in the unlicensed frequency band,
wherein the parameter for quasi co-location derivation is mapped to the table including a bit combination of the part of the bits indicating the synchronization signal block subcarrier offset and the bit indicating the common subcarrier spacing.

* * * * *